Oct. 20, 1942.　　R. A. COFFMAN　　2,299,465
POWER GENERATING UNIT
Filed Jan. 8, 1932　　2 Sheets-Sheet 1

Inventor
Roscoe A. Coffman,
By Shepherd Campbell
Attorneys

Oct. 20, 1942.　　　　R. A. COFFMAN　　　　2,299,465
POWER GENERATING UNIT
Filed Jan. 8, 1932　　　　2 Sheets-Sheet 2

Inventor
Roscoe A. Coffman,
By Shepherd & Campbell
Attorneys

Patented Oct. 20, 1942

2,299,465

UNITED STATES PATENT OFFICE 2,299,465

POWER GENERATING UNIT

Roscoe A. Coffman, Pittsburgh, Pa.

Application January 8, 1932, Serial No. 585,594

7 Claims. (Cl. 102—39)

This invention relates to a power generating unit adapted to generate and deliver large quantities of hot gases under considerable pressure for the performance of useful work.

In my copending application Serial No. 536,389, filed May 11, 1931, and application Serial No. 581,032, filed Dec. 14, 1931, I have disclosed devices of the general character of those to which the present invention relates, in connection with starters for internal combustion engines, but like the applications aforesaid the power generating unit of the present application is capable of general use. However, as this disclosure proceeds, it will be seen that the unit has been designedly made to provide for great economy in construction, freedom from gases deleterious to the mechanisms upon which the gases are to act; one capable of being loaded and fired in a very simple form of breech mechanism requiring no ejecting means, and one wherein the container of the fuel employed will be completely consumed along with the fuel and leave no ash or other objectionable residue. Therefore, it is to be understood that the unit of the present invention is designed to function with the mechanisms of the applications aforesaid and possesses all of the advantages ascribed to the power generating units disclosed in said applications.

It is also to be understood that this unit is adapted to function, broadly, for power producing purposes in any suitable device invented either by myself or others, and adapted to use a power generating unit of this character.

Broadly stated, the invention consists of a power generating unit consisting of a wholly self-contained assembly comprising the following instrumentalities:

1. A container of a consumable material which will burn with a clean flame and leave substantially no residue.

2. A body of burnable non-explosive fuel in the container which likewise will burn without ash or other residue.

3. An igniting means for the fuel permanently associated with the container and likewise consumable along with the fuel and container.

Many ways may be devised for accomplishing the foregoing objects, a few of which have been shown in the accompanying drawings wherein—

Figure 1:
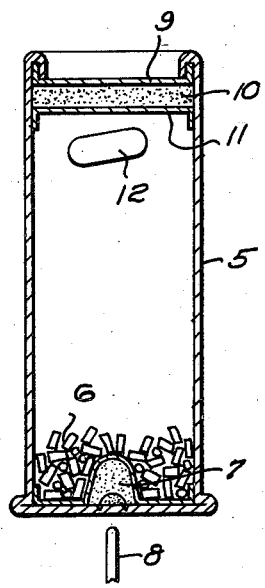
Figure 1 is a longitudinal sectional view of one form of the invention.

In the form of the invention illustrated in Fig. 1, 5 designates a container of somewhat the form and preferably of about the size of a conventional shotgun shell. This container is formed from nitrocellulose film which, as is well known, is easily burned; burns with a clean flame, and leaves no ash. 6 designates a body of fuel within the container which, like the fuel described in my aforesaid application Serial No. 581,032, comprises a plurality of granules or pellets of nitrocellulose material in the nature of smokeless powder.

A body of hot flash composition is disposed in the bottom of the shell, and this composition may be ignited by any suitable means, such, for example, as by projecting a hot point 8 through the material of the container 5 and into the hot flash composition; the means for heating and projecting the pin 8 constituting no part of the present invention.

The outer end of the shell may be closed in any suitable manner, as, for example, by a web or disc 9. I further contemplate the provision of a body of lubricant such as the graphite, indicated at 10, within the container and held in place by a second disc 11, which graphite may be conducted by the pressure of the gases generated from fuel 6, to a part to be operated, and aid in lubricating the same.

Any suitable lubricant may be employed, at 10. The discs 9 and 11 are made of the same material that the container 5 is made of so that they will be consumed along with the fuel and the container, or I may place a capsule of nitrocellulose film material capable of being consumed within the container 5, as indicated at 12, said capsule containing oil to be carried to and aid in lubricating the part that is operated by the pressure of the gases.

Figure 2:
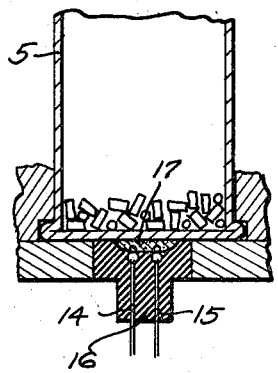
Figure 2 is a fragmentary sectional view illustrating another form of the invention.

In the form of the invention illustrated in Fig. 2, the structure of the shell is the same; the only difference being in the igniting means. Here two electric terminals 14 and 15 lead through a block of insulating material 16 and terminate in spaced points across which a hot jump spark may be created. This jump spark may be utilized to directly ignite the material of the container itself or a button 17 of a readily ignitible hot flash composition hereinafter described.

Figure 3:
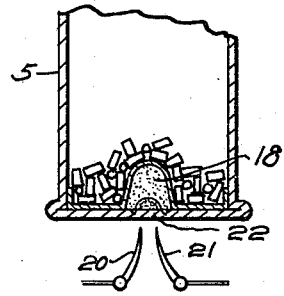
Figure 3 is a fragmentary sectional view illustrating a third form of the invention.

In the form of the invention illustrated in Fig. 3, the structure is the same as that recited in Fig. 1, but here the body of hot flash composition 18 is ignited by the thrusting of two spaced contact points 20 and 21 thereinto; it being understood that a jump spark is created by the closing of a proper circuit between said points. To aid in facilitating the entry of the points, the bottom of the container is provided with a weakened section 22.

Figure 4:
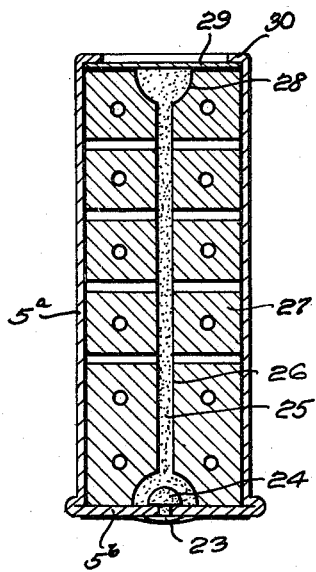
Figure 4 illustrates a further modification of the invention.
Figure 10:
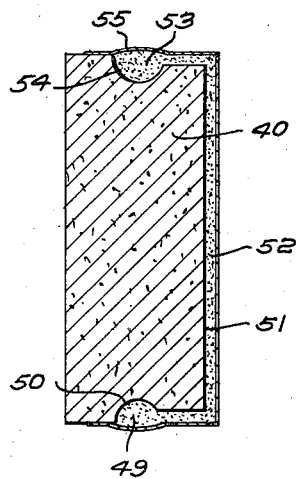

In the form of the invention illustrated in Fig. 4, the body 5a of the container may be a simple tube and its rear end may be completed by a cup-like cap 5b cemented thereon with nitrocellulose cement. This cap carries a button 23 of a readily ignitible match composition, such as, for example, cuprous acetylide adapted to be ignited by a jump spark from two such spaced contacts as are illustrated in Fig. 2. The ignition of the cuprous acetylide in turn ignites a hot flash composition which burns more slowly than the cuprous acetylide but still with considerable rapidity and with a hot flame. This hot flash composition, indicated at 24, may be composed of tetryl and a chromate or dichromate or any of the equivalents disclosed in my companion application Serial No. 581,032. The flame from the hot flash composition 24 may serve to ignite a body of granular material such as that indicated at 6 in Fig. 1 or it may serve to ignite a train of similar hot flash material 25 located in a central core 26 of a one piece pellet 27 of burnable fuel, of substantially the same nature although not of the same form as the fuel 6. An enlarged pocket 28 is formed in the outer end of the pellet 27; the purpose of this arrangement being to start the pellet to burn more rapidly in its outer end than at its inner end, so that there will be no tendency for the pressure of the generating gases to blow the generating unit out of place. Instead of having the train of hot flash material 25 located centrally in the pellet 27, said hot flash composition may be disposed in a groove formed along the side of the pellet, as illustrated in Fig. 10 and hereinafter more specifically described.

It will be understood that the container 5a and cap 5b are consumable along with the pellet since they are formed of a nitrocellulose film. A retaining web or disc 29 may be placed over the pocket 28 and the material of the container may be crimped thereover, as indicated at 30.

Figure 5:
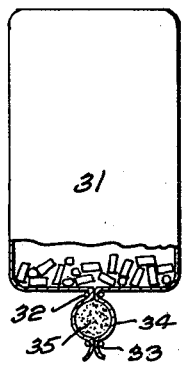
Figures 5 and 6 are views illustrating a form of the invention comprising a container in the nature of a bag.

In the form of the invention illustrated in Fig. 5, the container is in the form of a bag 31 of relatively thin flexible nitrocellulose film which contains a body of fuel of the character of that indicated at 6. The material of the bag is gathered and tied, at 32, and is again tied, at 33. A body of hot flash composition, similar to that indicated at 24, is placed in the portion 34 of the bag and the flaring terminal lower end of the bag, indicated at 35, is dipped in a match composition, such for example, as that indicated at 23 in Fig. 4.

It is apparent that if a cartridge of this sort be loaded into a breech block with the material 35 lying in contact with spaced contact points across which a jump spark may be created that such jump spark will ignite the match composition and that this will in turn ignite the hot flash composition, at 34, and thereby set fire to the container and the fuel therein.

Figure 6:
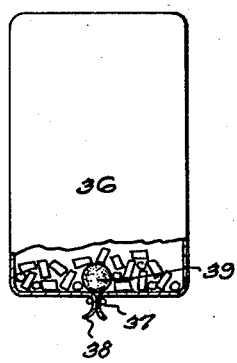

In the form of the invention illustrated in Fig. 6, the material of the nitrocellulose film bag 36 is gathered and tied, as indicated at 37, and its lower end 38 dipped in a match composition. The ignition of this match composition ignites a pellet 39 of hot flash composition like that at 24, and this in turn ignites the body of fuel of the character of that indicated at 6, which is contained within the bag 36.

Figure 7:
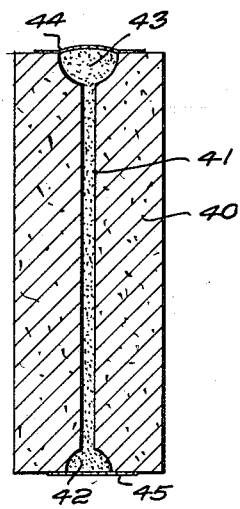
Figures 7, 8, 9, 10 and 11 illustrate further modifications hereinafter described.

In the form of the invention illustrated in Fig. 7, a solid pellet of burnable fuel 40, either with or without the aeration holes such as illustrated in Fig. 4, is provided with a central core 41 of combustible material adapted to act as a fuse to carry the fire from the cuprous acetylide 42 to the hot flash (tetryl and chromate) material 43 disposed at the forward end of the one piece pellet for igniting the same at that end. The cuprous acetylide and the hot flash composition are held in place and protected by thin wafers 44 and 45 of nitrocellulose film, cemented to the end of the pellet. This protection may be afforded by a layer of nitrocellulose lacquer brushed on to protect 42 and 43 from moisture and injury while rendering the whole ignitible under the influence of any of the igniting mediums described, with respect to Figs. 1 to 6.

Figure 8:
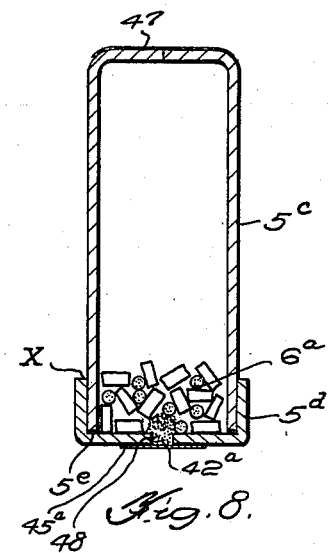
Figure 9:
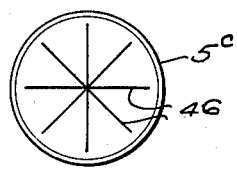

In the form of the invention illustrated in Figs. 8 and 9, the body 5c of the container is formed of a single piece of combustible material shaped as shown and scored or cut radially at its end, as at 46, to form a readily releasable closure. After such scoring or cutting, the end may be painted over, as indicated at 47, with a coating of nitrocellulose lacquer to seal the same The body 5c is filled with the fuel granules 6a, corresponding to those described with respect to Fig. 1, and is then closed by means of a cap or base 5d which is held in place by nitrocellulose cement indicated at 5e. This arrangement provides a lip X adapted to serve as a retainer for the shell to keep the shell from slipping down too far into a breech barrel of corresponding shape. The hot flash material 42a could be placed in the cap 5d before assembly of the parts or it could be pushed, in paste form, through the opening 48 after the shell is loaded and assembled and then closed by a nitrocellulose film or lacquer 45a as previously described.

Figure 11:
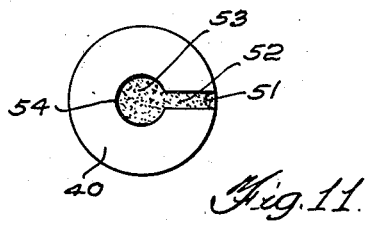

The form of the invention illustrated in Figs. 10 and 11 is very similar to that described with respect to Fig. 7 in that in both of these forms a pellet 40 of a burnable fuel such as a body of nitrocellulose, for example, is used without an enclosing shell of any kind; the pellet being loaded directly into the chamber in which it is to be fired, and the pellet being of such rigidity as to stand up under the loading operation in the absence of any enclosing shell. However, in Figs. 10 and 11 a body of cuprous acetylide 49 or like easily ignitible material is located in a recess 50 of the pellet which is provided with a groove 51 across its bottom, along one side and across its top, in which groove a train of quickly burnable composition 52 is disposed, said train leading to a body of hot flash material 53, such as tetryl and chromate composition hereinbefore described. The composition 52 is disposed in a recess 54 at the forward end of the shell and is sealed therein either by a wafer of nitrocellulose material 55, or by a nitrocellulose or like inflammable lacquer painted thereover. This protective coating of lacquer may be extended over the groove 51 throughout its length, for protective purposes. I am aware of the fact that under certain conditions of aeration and confinement nitrocellulose pelleted fuels may be made relatively highly explosive. By the term non-explosive or non-detonating as used in this specification and claims, I mean that the fuel is of such a nature as to size of pellets, degree of aeration and degree of confinement in the cartridge and under the conditions of use, that the charge while burning very fast does not burn fast enough to be termed explosive in the sense that it delivers a sharp blow upon the part to be moved but is rather of such nature as to apply the force with a pushing rather than a hammer blow effect. Nitrocellulose fuels when used as charges in large guns, for example, are required to impart to a projectile a speed of 4000 feet per second, or more, within the length of the gun barrel, while under the conditions of use of the present invention, a speed of from one foot to three feet per second of the part to be moved is all that is required.

It is apparent that any suitable way may be resorted to for igniting the match composition, such, for example, as an ordinary percussion cap and in the manner shown in my application Serial No. 581,032. It is apparent from the number of forms illustrated that many ways will readily suggest themselves to those skilled in the art, of accomplishing the desired result. Consequently, it is to be understood that the invention is not limited to the precise construction set forth, but that it includes within its purview whatever changes fairly come within the scope of the appended claims.

Having described my invention what I claim is:

1. A device of the character described comprising a container of flexible nitrocellulose film, a body of non-detonating fuel therein, a gathered closure part for said container, and a non-detonating igniting means carried by said gathered part.

2. A device of the character described comprising a container of a flexible nitrocellulose film gathered at two points at one end, a body of hot flash composition between two said gathered points, a body of match composition outwardly of said gathered points, and a body of deflagrating but non-explosive fuel in said container.

3. A non-explosive power generating unit comprising a container, a fuel therein, an igniting means permanently associated therewith, the whole being completely consumable together, means for weakening said container at its forward end, and a thin inflammable wafer over said weakened end.

4. A non-explosive power generating unit comprising a one piece pellet of deflagrating non-detonating material, a non-detonating igniting means permanently associated therewith and located at the rear end thereof, and means for conducting ignition from said ignition means to the forward end of the pellet, the whole being composed of materials completely consumable together substantially without ash.

5. A non-explosive power generating cartridge-like unit adapted to be charged into a breech block and comprising a container, a deflagrating non-detonating fuel therein, and a non-detonating igniting means permanently associated therewith, the whole being completely consumable together, said container being weakened at its forward end to permit the same to open when pressure is generated therein, to thereby permit fuel to pass from said container to another point for combustion.

6. A non-explosive power generating cartridge-like unit adapted to be charged into a breech block and comprising a container, a deflagrating non-detonating fuel therein, and a non-detonating igniting means permanently associated therewith, the whole being completely consumable together, in combination with means for weakening the end of the container, and a coating of inflammable lacquer over said weakened portion.

7. A non-explosive power generating cartridge-like unit adapted to be charged into a breech block and comprising a container, a deflagrating non-detonating fuel therein, and a non-detonating igniting means permanently associated therewith, the whole being completely consumable together, said container comprising a body portion, and a cap constituting a rear cover for the same, said rear cover being adapted to limit the introduction of said container into a combustion chamber.

ROSCOE A. COFFMAN.